United States Patent
Bullappa

(10) Patent No.: US 8,395,988 B2
(45) Date of Patent: Mar. 12, 2013

(54) METHOD AND SYSTEM FOR PROVIDING VOICE SURVIVABILITY

(75) Inventor: Kannakatti Bullappa, Sunnyvale, CA (US)

(73) Assignee: Alcatel Lucent, Paris (FR)

( * ) Notice: Subject to any disclaimer, the term of this patent is extended or adjusted under 35 U.S.C. 154(b) by 173 days.

(21) Appl. No.: 12/383,938

(22) Filed: Mar. 30, 2009

(65) Prior Publication Data

US 2010/0246384 A1   Sep. 30, 2010

(51) Int. Cl.
 *H04J 3/14*      (2006.01)
(52) U.S. Cl. ........ 370/217; 370/221; 370/241; 370/225; 370/401; 370/352
(58) Field of Classification Search ................... 370/217, 370/221, 241, 352, 356
See application file for complete search history.

(56) References Cited

U.S. PATENT DOCUMENTS

| | | | | |
|---|---|---|---|---|
| 6,601,084 B1* | 7/2003 | Bhaskaran et al. | ........... | 718/105 |
| 7,532,568 B1* | 5/2009 | Boudreaux et al. | ........... | 370/217 |
| 2001/0050911 A1* | 12/2001 | Eastman | ........................ | 370/352 |
| 2003/0128663 A1* | 7/2003 | Kramer | ........................ | 370/222 |
| 2005/0074016 A1* | 4/2005 | Dekeyser | ........................ | 370/401 |
| 2006/0077898 A1* | 4/2006 | Yamaguchi et al. | .......... | 370/235 |
| 2006/0251052 A1* | 11/2006 | Croak et al. | .................. | 370/352 |
| 2007/0165516 A1* | 7/2007 | Xu et al. | ........................ | 370/217 |
| 2008/0313488 A1* | 12/2008 | Jeong et al. | ..................... | 714/2 |
| 2009/0022145 A1* | 1/2009 | Bakshi et al. | ................. | 370/352 |

* cited by examiner

*Primary Examiner* — Ricky Ngo
*Assistant Examiner* — Rasheed Gidado
(74) *Attorney, Agent, or Firm* — Hitt Gaines, PC

(57) ABSTRACT

A system for controlling telecommunication equipment configured to provide voice survivability within a telecommunication network comprises a call server monitoring apparatus, a penalty management apparatus, and a call server management apparatus. The call server monitoring apparatus is configured for monitoring a connectivity status of a call server. The penalty management apparatus is configured for managing a current accumulated penalty value of the call server. Managing the current accumulated penalty value includes adjusting the current accumulated penalty value dependent upon both the connectivity status and elapsed-time. The call server management apparatus is configured for controlling operability of the call server dependent upon the current accumulated penalty value.

18 Claims, 3 Drawing Sheets

METHOD AND SYSTEM FOR PROVIDING VOICE SURVIVABILITY

FIELD OF THE DISCLOSURE

The disclosures made herein relate generally to connectivity status of call servers, more particularly, to configuring call servers and associated network elements for providing voice survivability using a local proxy.

BACKGROUND

In a typical enterprise deployment, all voice related functionality is implemented at a central office. Branch offices rely on such central office functionality for performance of branch office functionality. Examples of such branch office functionality include, but are not limited to, call processing, voice messaging, interactive voice response (IVR), message on hold (MOH), and the like.

FIG. 1 shows a prior art enterprise deployment architecture for providing such central office and branch office functionalities. An enterprise deployment architecture in accordance as shown in FIG. 1 represents a normal VOIP deployment, which includes Head Quarter (HQ), Regional Head Office (RHQ) and one or more Branch Offices (BO), and a depending number of users in the particular sites. Primary and secondary call servers (CS1, CS2) are deployed in HQ and a tertiary call server CS3 is deployed in the RHQ. All the sites (HQ, RHQ, BO1, BO2) are equipped with network equipment, such as Gateways (G1-G4), each having a Voice Survivability feature provided thereon. The sites are interconnected via an Internet Service Provider network (ISP) and a Public Switched telephone Network (PSTN). An administrator will specify the priority to each call server (CS1-CS3) via a configuration function. For example, when the primary call server CS1 flaps (e.g. due to software problem in call server or connection issue), the Branch Office 1 (BO1) voice network will migrate to secondary call server CS2. As such, the secondary call server CS2 will serve all users that were previously served by the primary call server CS1. As soon as the primary call server becomes available again, all sites will migrate back to the primary call server CS1.

A deployment architecture as shown in FIG. 1 has been popularised by major VOIP venders, as it reduces overall costs of administration and maintenance. However, this deployment architecture also brings about the challenge of maintaining availability of voice services in branch offices when centralized call processing fails. Examples of such centralized call processing failures include, but are not limited to, call server connection flaps, wide area network (WAN) links fail/down, and the like.

Several prior art solutions have been offered to solve the problem of voice survivability by deploying a local proxy within enterprise deployment equipment at the branch offices. The local proxy at each branch offices monitors call servers (e.g., primary, secondary and tertiary call servers) and takes over call processing when a call processing failure takes place. While such a proxy-based solution to call survivability solves the problem of WAN link outages, it does not provide a resilient solution in the situation where a call server connection flaps periodically. In such a situation, the local proxy will keep migrating between different call servers and, even though such call servers are prone to flapping, phone connection to such call servers will continue to be made as long as the call servers are reachable. In view of connections of a call server flapping, the local proxy will continue to migrate to different call servers thereby causing adverse conditions such as dropped calls, failure in connection and the like.

SUMMARY OF THE DISCLOSURE

Provided are approaches and embodiments for controlling migration of a call server proxy from one call server to a different call server in a manner that mitigates at least one the adverse conditions resulting from such proxy-based voice survivability. Through the use of an accumulated penalty value that is incremented as a function of consecutive lost connectivity instances and that is decremented as a function of time, migration of a call server proxy to a call server experiencing intermittent connectivity can be advantageously controlled. As such, end users served by the call server proxy will be less prone to experiencing dropped calls and the quality of calls will not be adversely affected. In this manner, embodiments of the present invention provide true high availability for voice calls subjected to proxy-based voice survivability (e.g., proxy-based voice survivability discussed above).

In one embodiment of the invention, a system for controlling telecommunication equipment configured to provide voice survivability within a telecommunication network comprises a call server monitoring apparatus, a penalty management apparatus, and a call server management apparatus. The call server monitoring apparatus is configured for monitoring a connectivity status of a call server. The penalty management apparatus is configured for managing a current accumulated penalty value of the call server. Managing the current accumulated penalty value includes adjusting the current accumulated penalty value dependent upon both the connectivity status and elapsed-time. The call server management apparatus is configured for controlling operability of the call server dependent upon the current accumulated penalty value.

In another embodiment of the present invention, a method comprises a plurality of operations. An operation includes one or more data processing devices of a data computing system accessing, from memory coupled to the one or more data processing devices, instructions causing the one or more data processing devices to determine when one of a plurality of call servers has experienced an instance of connectivity thereto being lost. Another operation includes the one or more data processing devices accessing, from the memory, instructions causing the one or more data processing devices to associate a first penalty with such one call server (i.e., the lost connectivity call server) for each instance of lost connectivity thereby generating a current accumulated penalty value for such one call server. Another operation includes the one or more data processing devices accessing, from the memory, instructions causing the one or more data processing devices to control operability of such one call server dependent upon the current accumulated penalty value. Causing the one or more data processing devices to control operability includes causing the one or more data processing devices to transition such one call server from an active operational status to an inactive operational status in response to incrementing the current accumulated penalty value to reach a first penalty threshold value and causing the one or more data processing devices to transition such one call server from the inactive operational status to the active operational status in response to reducing the current accumulated penalty value from at or above the first penalty threshold value to reach a second penalty threshold value. Another operation includes the one or more data processing devices accessing, from the memory, instructions causing the one or more data processing devices to reduce the current accumulated penalty value at a rate of reduction in response to causing the one or more data processing devices to transition such one call server from the active operational status to the inactive operational status.

In another embodiment of the present invention, an apparatus is configured for managing penalties used in controlling proxy-based call survivability functionality within a telecommunication network and comprises an interface, memory, and one or more processors. The interface is configured for having a plurality of call servers connected thereto. The memory has instructions stored thereon and accessible therefrom. The one or more processor are configured for accessing and interpreting the instructions. The one or more processors are coupled to the interface for enabling communication between the one or more processors and each one of the call servers. The instructions are configured for determining when one of a plurality of call servers has experienced an instance of connectivity thereto being lost. The instructions are further configured for associating a first penalty with such one call server for each instance of such lost connectivity thereby generating a current accumulated penalty value for such one call server. The instructions are further configured for controlling operability of such one call server dependent upon the current accumulated penalty value. Controlling operability includes transitioning such one call server from an active operational status to an inactive operational status in response to incrementing the current accumulated penalty value to reach a first penalty threshold value and transitioning such one call server from the inactive operational status to the active operational status in response to reducing the current accumulated penalty value from at or above the first penalty threshold value to reach a second penalty threshold value. The instructions are further configured for reducing the current accumulated penalty value at a prescribed rate of reduction in response to transitioning such one call server from the active operational status to the inactive operational status.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
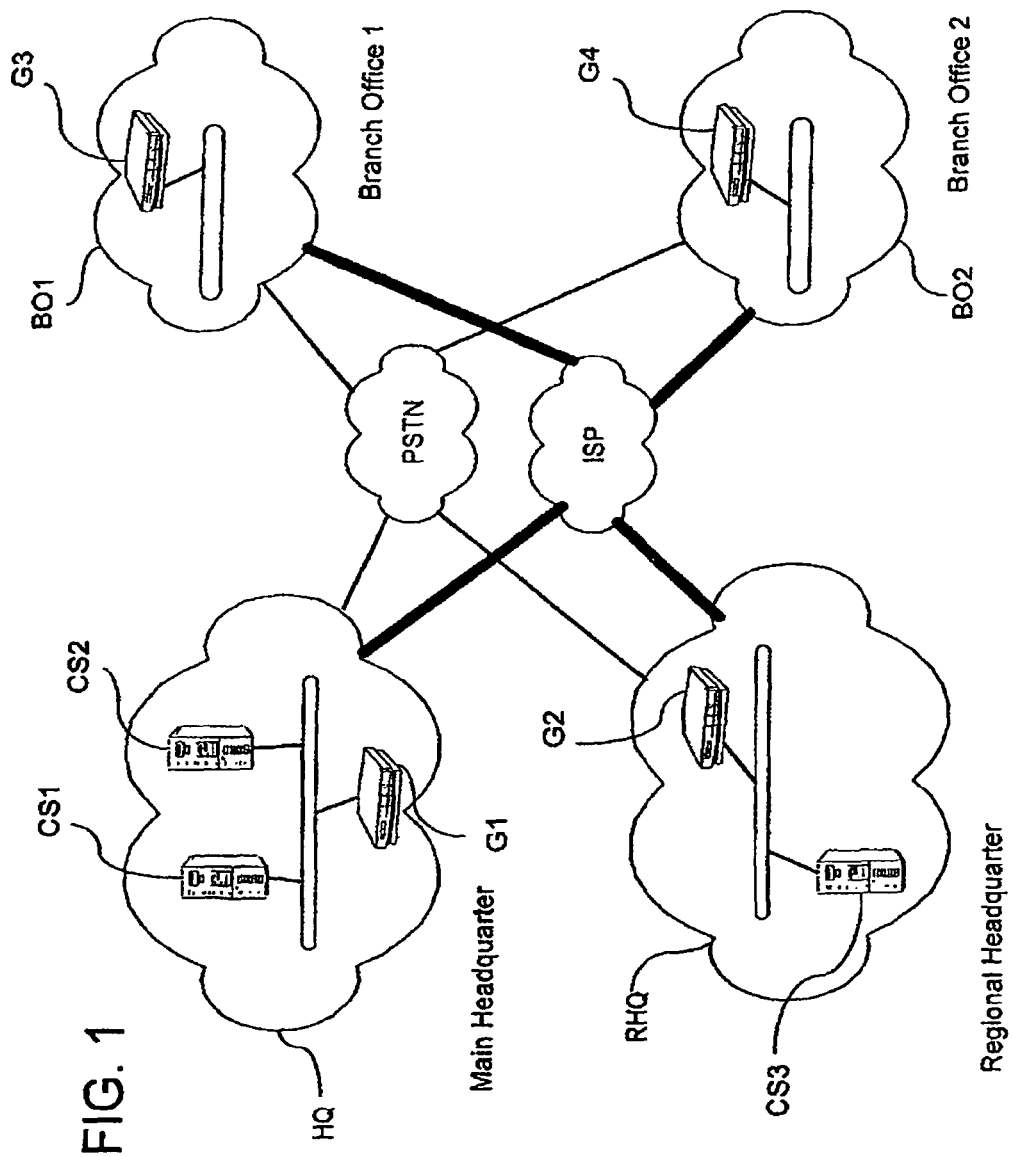
FIG. 1 shows a prior art enterprise deployment architecture that includes a plurality of call servers and a plurality of gateways configured for providing voice survivability functionality.

As discussed above, FIG. 1 shows a prior art enterprise deployment architecture for providing central office and branch office functionalities. An enterprise deployment architecture as shown in FIG. 1 represents a conventional VOIP deployment, which includes Head Quarter (HQ), Regional Head Office (RHQ) and one or more Branch Offices (BO). Primary and secondary call servers (CS1, CS2) are deployed in HQ and a tertiary call server CS3 is deployed in the RHQ. All of the branch sites (HQ, RHQ, BO1, BO2) are equipped with Gateways (G1-G4) each having a voice survivability feature provided thereon. The call servers are prioritized such that service is first provided by the primary call server, second by the secondary call server and third by the tertiary call server. For example, when the primary call server CS1 flaps (e.g. due to software problem in call server or connection issue), the Branch Office 1 (BO1) voice network will migrate to secondary call server CS2. As such, the secondary call server CS2 will serve all users that were previously served by the primary call server CS1. As soon as the primary call server becomes available again, all sites will migrate back to the primary call server CS1.

However, problems with voice survivability can exist as a result of intermittent instability of a call server. For example, if the primary call server CS1 goes down during migration from the secondary call server CS2 to the primary call server CS1 while a user from the BO1 site is making a call to a user in the HQ site or even in the same site, the call will not succeed until migration back to the secondary call server CS2 is completed or, worse, the call might be dropped due this migration process. As discussed above, a local proxy at each branch offices can monitor the call servers and take over call processing when a call processing failure takes place. Implementations of the present invention will preclude the local proxy from uncontrollably migrating between different call servers, which is especially advantageous in situations wherein a call server is exhibiting intermittent instability.

In accordance with the embodiments of the present invention, dampening of call servers (i.e., call server dampening functionality) is implemented for solving call server migration issues associated with prior art implementations of network devices (e.g., gateways) having known voice survivability features/functionality integrated therein. The underlying objective of such call server dampening functionality is to reduce the number of migrations between interconnected call servers. To accomplish this objective, criteria is defined for satisfactorily behaved and unsatisfactorily behaved call servers. Implementation of call server dampening functionality in accordance with embodiments of the present invention defines and identifies unsatisfactorily behaved call servers that exhibit lost connectivity (or other adverse issues) associated with link flaps. Such unsatisfactorily behaved call servers will be suppressed for future migration until there is some degree of confidence that the call server has stabilized and its connectivity is predictable and/or reliable.

The behavior of the unstable call servers is fairly predictable. Accordingly, call server dampening functionality in accordance with embodiments of the present invention make use of such predictability to track the connectivity status of call servers. When the connectivity to a call server is repeatedly lost within a predetermined timeframe, call server dampening functionality in accordance with embodiments of the present invention implements a penalty based system for suppressing future migration until there is some degree of confidence that the call server has stabilized and its connectivity is predictable and/or reliable.

Figure 2:
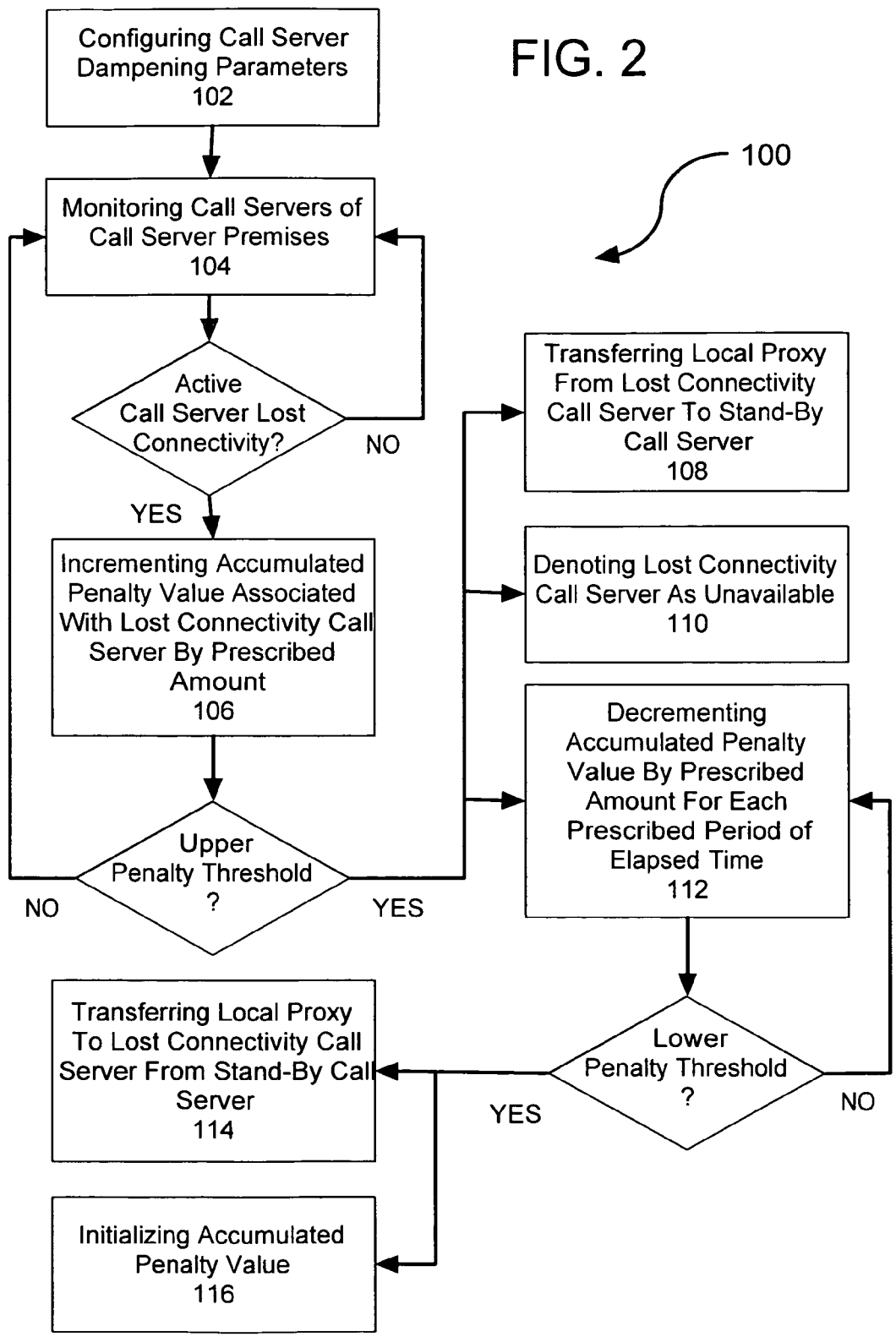
FIG. 2 shows an embodiment of an exemplary method for implementing call server dampening functionality in accordance with the present invention.

Referring now to FIG. 2, an exemplary method 100 for implementing call server dampening functionality in accordance with an illustrative embodiment of the present invention is shown. Preferably, but not necessarily, such a method is implemented within a network element (e.g., an enterprise edge device) such as, for example, a router or switch. In one embodiment, a router or switch configured for implementing call server dampening functionality in accordance with the present invention is located within a telephone network such as the ISP or PSTN shown in FIG. 1

An optional operation 102 may be performed for configuring call server dampening parameters, which will be described below in greater detail. Such parameters may be selected, for example, by a system administrator, or may be otherwise established, for example, by program coding. After the call server dampening parameters are configured or established, an operation 104 is performed for monitoring a plurality of interconnected call servers (e.g., those shown in FIG. 1) for determining when one of the call servers has experienced an instance of connectivity thereto being lost. Such a call server that has experienced an instance of lost connectivity is referred to herein as a lost connectivity call server. When it is determined that one of the call servers being monitored has experienced an instance of lost connectivity, an operation 106 is performed for incrementing a penalty value (i.e., a current accumulated penalty value) associated with the lost connection call server by a first amount (e.g., penalty increment value as configured at operation 102). Such incrementing is also referred to herein as associating a first penalty with the lost connectivity call server. If the current accumulated penalty value is below an upper penalty threshold (e.g., upper penalty threshold as configured at operation 102), the method continues to monitor the call servers at the operation 104. Any consecutive occurrences of lost connectivity will result in further incrementing of the current accumulated penalty value. In one embodiment, an administrator or other entity can specify a desired approach for the penalty increment value or its calculation. It is disclosed herein that the present invention in not unnecessarily limited to any particular value or approach for incrementing the current accumulated penalty value.

In response to the current accumulated penalty value reaching (e.g., being greater than or equal to, being greater than, etc) the prescribed upper penalty threshold, the lost connectivity call server is dampened. Such dampening includes an operation 108 being performed for transferring a local proxy from the lost connectivity server to a stand-by (i.e., auxiliary) call server and, optionally if needed, an operation 110 being performed for denoting the lost connectivity call server as unavailable. For example, in the case of the enterprise deployment architecture shown in FIG. 1, the local proxy would be transferred from the primary call server CS1 to the secondary call server CS2.

In response to determining that the current accumulated penalty value has reached the upper penalty threshold or after transferring the local proxy from the lost connectivity server to the stand-by call server, an operation 112 is performed for decrementing the current accumulated penalty value by a second amount for each predetermined period of elapsed time (i.e., at a predetermined time-based rate of reduction). In one embodiment of the present invention, the current accumulated penalty value is decremented according to a half-life decay rate. In other embodiments, an administrator or other entity can specify a desired approach for decrementing the current accumulated penalty value such as for example a linear decay rate. It is disclosed herein that the present invention in not unnecessarily limited to any particular approach for decrementing the current accumulated penalty value. Such time-based decrementing is performed until the current accumulated penalty value reaches (e.g., is less than or equal to, is less than, etc) a prescribed lower penalty threshold (e.g., lower penalty threshold as configured at operation 102). Thereafter, an operation 114 is performed for transferring the local proxy to the previously lost connectivity call server (e.g., the now active primary call server) from the stand-by call server and, optionally if needed, an operation 116 is performed for initializing the current accumulated penalty value (e.g., resetting to an initial value as configured at operation 102). Optionally, the operation for transferring the local proxy to the previously lost connectivity call server (e.g., the now active primary call server) from the stand-by call server can be delayed until some specified time in the future or based on some specified event/condition. For example, if the network system has sufficient resources, call server functionality can continue to be performed by the stand-by call server (e.g., the secondary server), and such transferring can be scheduled to take place at a specified time (e.g., at night, when demand is below a prescribed level for a prescribed period of time, etc). Thus, it is disclosed herein that the condition(s) under which the local proxy is transferred back to the primary call server can be a configurable parameter (e.g., configurable by a system administrator).

As can be seen, controlling operability of a lost connectivity call server in accordance with such call server dampening functionality includes transitioning the lost connectivity call server from an active operational status to an inactive operational status transition (e.g., precluding the lost connectivity call server from being used by a local proxy) in response to incrementing the current accumulated penalty value to reach a first prescribed penalty threshold value (e.g., the upper penalty threshold) and transitioning the lost connectivity call server from the inactive operational status to the active operational status (e.g., allowing said one call server to be used by the local proxy) in response to reducing the current accumulated penalty value from the first prescribed penalty threshold value to reach a second prescribed penalty threshold value (e.g., the lower penalty threshold). As can also be seen, controlling operability of a lost connectivity call server in accordance with call server dampening functionality provided may include causing another call server (e.g. the secondary call server) to become operable to provide call server functionality in place of the lost connectivity call server (e.g., the primary call server) in conjunction with precluding the lost connectivity call server from being used by the local proxy. In one example, causing another call server (e.g. the secondary call server) to become operable to provide call server functionality in place of the lost connectivity call server can be performed as a result of the lost connectivity call server being precluded from being used by the local proxy. In another example, causing another call server (e.g. the secondary call server) to become operable to provide call server functionality in place of the lost connectivity call server can be performed upon determining that the lost connectivity call server is to be precluded from being used by the local proxy. However, it is disclosed herein that embodiments of the present invention are not unnecessarily limited to any particular sequence in which the lost connectivity call server is precluded from being used by the local proxy and another call server (e.g. the secondary call server) becomes operable to provide call server functionality in place of the lost connectivity call server. Preferably, but not necessarily, transition from the lost connectivity call server to another call server would be performed in a manner that is transparent to a user.

Decrementing the accumulated penalty value can be implemented in any number of ways. Broadly speaking, decrementing (i.e., reducing) the current accumulated penalty value can include reducing the current accumulated penalty value by a fixed amount or a fixed percentage thereof for each expiration of a duration of time. In one specific embodiment, the fixed percentage is 50 percent and the duration of time is a fixed duration of time such that the current accumulated penalty value is reduced in accordance with half-life decay thereof.

Example—Call Server Dampening Functionality

An administrator may configure call server dampening parameters as follows:

Hello Time value set to 5 seconds;
Hold Timer value set to 3;
Upper Penalty Threshold value set to 15;
Lower Penalty Threshold value set to 1;
Penalty Increment value set to 5;
Penalty Decrement value set to Half-Life; and
Penalty Decay Timer set to 5 seconds.

A network element configured for implementing call server dampening functionality in accordance with the present invention (i.e., call server dampening apparatus) monitors a call server. Such monitoring includes sending hello messages to the call server and expecting to receive a response message from the calls server. The call server dampening apparatus sends a hello message to the call server in 5 second intervals (i.e., the Hello Time value). For each hello message not responded to, a Current Accumulated Penalty value is incremented from an initial value (e.g., 0) by the Penalty Increment value. In response to the call server replying to a subsequent hello message prior to the Current Accumulated Penalty value reaching the Upper Penalty Threshold, the Current Accumulated Penalty value is reset to its initial value. If the call server fails to reply to three consecutive hello messages (i.e., Hold Timer value), the Current Accumulated Penalty value will have been incremented to reach the Upper Penalty Threshold value of 15, whereby the call server is dampened and its service is replaced by another call server. The Current Accumulated Penalty value is then reduced according to half-life decay (e.g., 7.5 after a first decay time interval (i.e., 5 second), 3.75 after a second decay time interval (i.e., 10 second), 1.88 after a third decay timer interval (i.e., 15 seconds) and 0.94 after a fourth decay timer interval (i.e., 20 seconds)). With the Current Accumulated Penalty now reaching the Lower Penalty Threshold value, the call server is undampened and its returns to an active state.

Figure 3:
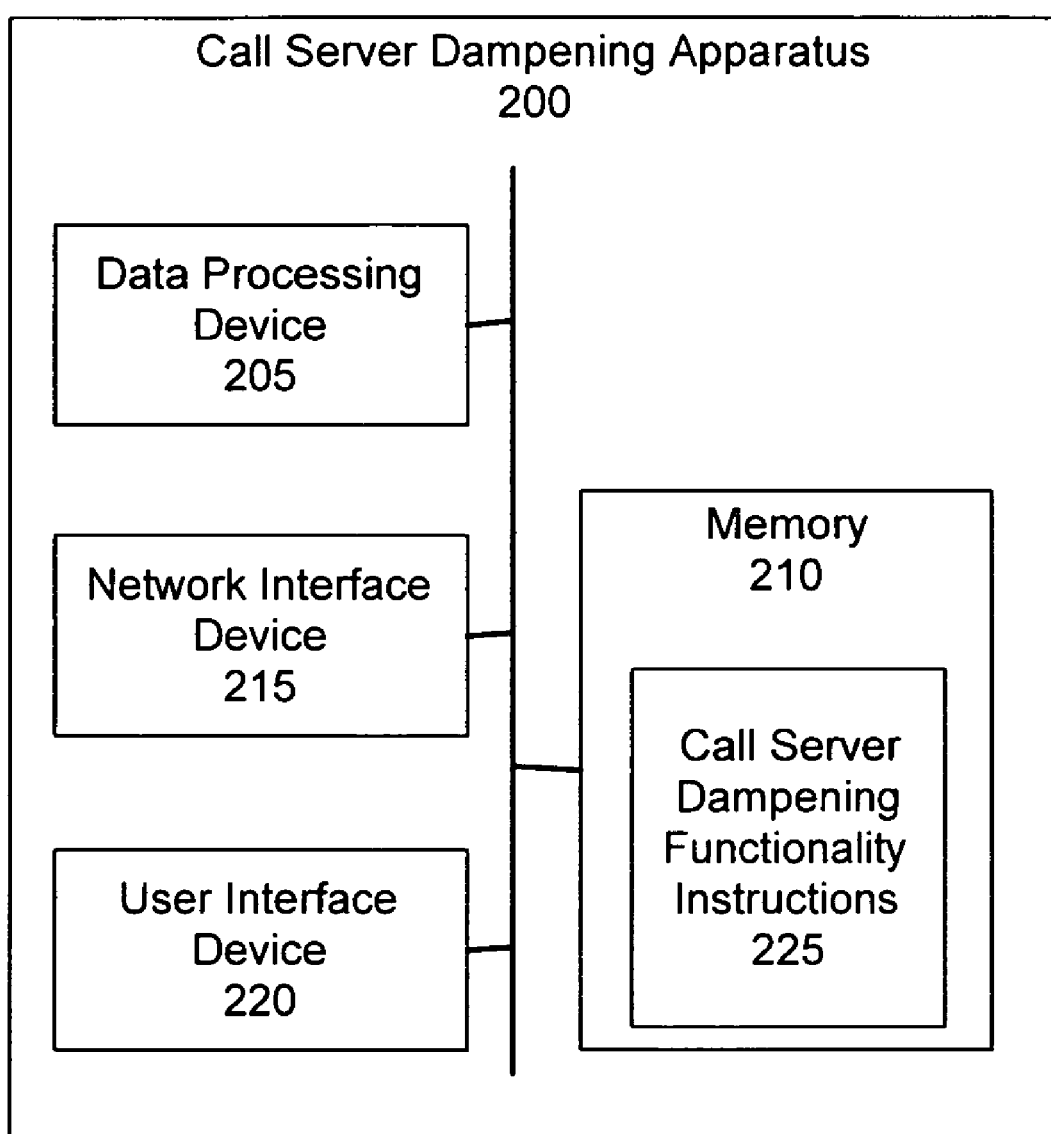
FIG. 3 shows an embodiment of an exemplary call server dampening apparatus configured in accordance with the present invention.

Referring now to FIG. 3, an apparatus 200 configured in accordance with an exemplary embodiment of the present invention (i.e., a call server dampening apparatus 200) can manage penalties used in controlling proxy-based call survivability functionality within a telecommunication network. The call server dampening apparatus 200 includes a data processing device 205, memory 210, a network interface device 215 and a user interface device 220. The data processing device 205, the memory 210, the network interface device 215 and the user interface device 220 are interconnected for enabling interaction therebetween. Residing in the memory 210 are instructions 225 for, among other functionality, carrying out call server dampening functionality in accordance with the present invention (e.g., as embodied in the method 100). The instructions 225 are accessible from within the memory 210 and are processable by the data processing device 205. The instructions 225 are configured for enabling the data processing device 205 to facilitate operations comprising call server dampening functionality in accordance with the present invention (e.g., as embodied in the method 100).

With respect to instructions processible by a data processing device, it will be understood from the disclosures made herein that methods, processes and/or operations adapted for carrying out call server dampening functionality as disclosed herein are tangibly embodied by computer readable medium having instructions thereon that are configured for carrying out such functionality. In one specific embodiment, the instructions are tangibly embodied for carrying out the method 100 disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has stored thereon a computer program (i.e., instructions) adapted for carrying out call server dampening functionality in accordance with the present invention.

A skilled person will appreciate that a system for controlling telecommunication equipment configured to provide voice survivability within a telecommunication network can be configured in accordance with the present invention. In one embodiment, the system comprises a call server monitoring apparatus, a penalty management apparatus, and a call server management apparatus. The call server monitoring apparatus is configured for monitoring a connectivity status of a call server. The penalty management apparatus is configured for managing a current accumulated penalty value of the call server. Managing the current accumulated penalty value includes adjusting the current accumulated penalty value dependent upon both the connectivity status and elapsed-time. The call server management apparatus is configured for controlling operability of the call server dependent upon the current accumulated penalty value.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method, comprising:
at least one data processing device of a data computing system accessing, from memory coupled to said at least one data processing device, instructions causing said at least one data processing device to determine when one of a plurality of call servers has experienced an instance of connectivity thereto being lost by sending a monitoring message to said one call server periodically;

said at least one data processing device accessing, from said memory, instructions causing said at least one data processing device to associate a first penalty with said one call server for each instance of said lost connectivity thereby generating a current accumulated penalty value for said one call server;

said at least one data processing device accessing, from said memory, instructions causing said at least one data processing device to control operability of said one call server dependent upon the current accumulated penalty value, wherein causing said at least one data processing device to control operability includes causing said at least one data processing device to transition said one call server from an active operational status to an inactive operational status in response to incrementing the current accumulated penalty value to reach a first upper penalty threshold value and causing said at least one data processing device to transition said one call server from the inactive operational status to the active operational status in response to reducing the current accumulated penalty value from the first prescribed penalty threshold value to reach a second lower penalty threshold value, wherein the current accumulated penalty value reaches the first upper penalty threshold value when said one call server fails to reply to said monitoring message consecutively; and said at least one data processing device accessing, from said memory, instructions causing said at least one data processing device to reduce the current accumulated penalty value at by a rate of reduction in response to causing said at least one data processing device to transition said one call server from the active operational status to the inactive operational status wherein causing said at least one data processing device to reduce the current accumulated penalty value includes decrementing the current accumulated penalty value by a fixed percentage thereof for each expiration of a first duration of time.

2. The method of claim 1 wherein: causing said at least one data processing device to transition said one call server from the active operational status to the inactive operational status includes causing said at least one data processing device to preclude said one call server from being used by a local proxy; and causing said at least one data processing device to transition said one call server from the inactive operational status to the active operational status includes causing said at least one data processing device to allow said one call server to be used by the local proxy.

3. The method of claim 2 wherein: causing said at least one data processing device to control operability of said one call server includes causing said at least one data processing device to cause another call server to become operable to provide call server functionality in place of said one call server; causing said at least one data processing device to cause another call server to become operable to provide call server functionality in place of said one call server is performed in conjunction with causing said at least one data processing device to preclude said one call server from being used by the local proxy.

4. The method of claim 1 wherein the fixed percentage is a constant fixed percentage.

5. The method of claim 4 wherein the fixed percentage is 50 percent such that said decrementing is performed in accordance with half-life decay of the current accumulated penalty value and wherein there are multiple expirations of the first duration of time.

6. The method of claim 5 wherein:
causing said at least one data processing device to transition said one call server from the active operational status to the inactive operational status includes causing said at least one data processing device to preclude said one call server from being used by a local proxy; and
causing said at least one data processing device to transition said one call server from the inactive operational status to the active operational status includes causing said at least one data processing device to allow said one call server to be used by the local proxy.

7. The method of claim 6 wherein causing said at least one data processing device to control operability of said one call server includes when causing said at least one data processing device to preclude said one call server from being used by the local proxy, causing said at least one data processing device to cause another call server to become operable to provide call server functionality in place of said one call server.

8. A system for controlling telecommunication equipment configured to provide voice survivability within a telecommunication network, comprising:
a call server monitoring apparatus configured for monitoring a connectivity status of a call server wherein said monitoring includes determining when the call server has experienced a condition that causes connectivity thereto to be lost by sending a monitoring message to said one call server periodically;
a penalty management apparatus configured for managing a current accumulated penalty value of the call server, wherein said managing includes adjusting the current accumulated penalty value dependent upon both the connectivity status and elapsed-time wherein said adjusting includes increasing the current accumulated penalty value by a first amount for each instance of said lost connectivity and reducing the current accumulated penalty value at a time-dependent rate of reduction and wherein said reducing includes decrementing the current accumulated penalty value by a fixed percentage thereof for each expiration of a first duration of time, wherein said increasing includes increasing the current accumulated penalty value to reach an upper penalty threshold when the call server fails to reply to said monitoring messages consecutively; and
a call server management apparatus configured for controlling operability of the call server dependent upon the current accumulated penalty value.

9. The system of claim 8 wherein said fixed percentage is a constant fixed percentage.

10. The system of claim 8 wherein said controlling includes: precluding the call server from being used by a local proxy in response to the current accumulated penalty value reaching the upper penalty threshold; and allowing said one call server to be used by a local proxy in response to the current accumulated penalty value reaching a lower penalty threshold.

11. The system of claim 10 wherein said controlling includes causing another call server to become operable to provide call server functionality in place of the call server in response to the current accumulated penalty value reaching the upper penalty threshold.

12. An apparatus configured for managing penalties used in controlling proxy-based call survivability functionality within a telecommunication network, comprising:
an interface configured for having a plurality of call servers coupled thereto;
memory having instructions stored thereon and accessible therefrom;
at least one processor configured for accessing and interpreting said instructions, wherein said processor is coupled to the interface for enabling communication between said at least one processor and each one of said call server servers;
wherein said instructions are configured for:
determining when one of a plurality of call servers has experienced an instance of connectivity thereto being lost by sending a monitoring message to said one call server periodically;

associating a first penalty with said one call server for each instance of said lost connectivity thereby generating a current accumulated penalty value for said one call server;

controlling operability of said one call server dependent upon the current accumulated penalty value, wherein controlling operability includes transitioning said one call server from an active operational status to an inactive operational status in response to incrementing the current accumulated penalty value to reach a first upper penalty threshold value and transitioning said one call server from the inactive operational status to the active operational status in response to reducing the current accumulated penalty value from the first prescribed penalty threshold value to reach a second lower penalty threshold value, wherein the current accumulated penalty value reaches the first upper penalty threshold value when said one call server fails to reply to said monitoring message consecutively; and reducing the current accumulated penalty value at a rate of reduction in response to transitioning said one call server from the active operational status to the inactive operational status wherein reducing the current accumulated penalty value includes decrementing the current accumulated penalty value by a fixed percentage thereof for each expiration of a first duration of time.

13. The apparatus of claim 12 wherein: transitioning said one call server from the active operational status to the inactive operational status includes precluding said one call server from being used by a local proxy; and transitioning said one call server from the inactive operational status to the active operational status includes allowing said one call server to be used by the local proxy.

14. The apparatus of claim 13 wherein controlling operability of said one call server includes causing another call server to become operable to provide call server functionality in place of said one call server in response to incrementing the current accumulated penalty value to reach a first upper penalty threshold value.

15. The apparatus of claim 12 wherein the fixed percentage is a constant fixed percentage.

16. The apparatus of claim 15 wherein:

transitioning said one call server from the active operational status to the inactive operational status includes precluding said one call server from being used by a local proxy; and transitioning said one call server from the inactive operational status to the active operational status includes allowing said one call server to be used by the local proxy.

17. The apparatus of claim 16 wherein controlling operability of said one call server includes causing another call server to become operable to provide call server functionality in place of said one call server in response to incrementing the current accumulated penalty value to reach a first upper penalty threshold value.

18. The apparatus of claim 15 wherein the constant fixed percentage is 50 percent such that the current accumulated penalty value is reduced in accordance with half-life decay thereof.

* * * * *